United States Patent [19]

Flack, deceased et al.

[11] Patent Number: 4,497,380
[45] Date of Patent: Feb. 5, 1985

[54] HAND-HELD POWER TOOLS INCLUDING BEARING SUPPORTS FOR COMPONENTS UNDERGOING LINEAR MOVEMENT

[75] Inventors: John H. Flack, deceased, late of Uxbridge, England, by Margaret A. Flack, administrator; Frank F. Simpson, Staines, England

[73] Assignee: Black & Decker Inc., Newark, Del.

[21] Appl. No.: 389,142

[22] Filed: Jun. 16, 1982

[30] Foreign Application Priority Data

Jun. 17, 1981 [GB] United Kingdom ............ 81.18671

[51] Int. Cl.³ ............................................. F16C 5/00
[52] U.S. Cl. .................................. 173/117; 173/122; 308/3 R; 308/4 R
[58] Field of Search .............. 173/109, 112, 48, 118, 173/117, 122; 308/3 R, 3 CH, 4 R, 5 R

[56] References Cited

U.S. PATENT DOCUMENTS 3,545,823 12/1970 Alsruhe ........................ 308/3 R X
3,828,865 8/1974 Schnizler, Jr. ................. 173/48 X
3,837,409 9/1974 Consoli et al. ................. 173/48 X
4,114,699 9/1978 Wolf ............................ 173/109 X

FOREIGN PATENT DOCUMENTS 12438 6/1980 European Pat. Off. .
14760 9/1980 European Pat. Off. .
25153 3/1981 European Pat. Off. .
2938206 4/1981 Fed. Rep. of Germany .
2230467 12/1974 France .
2303641 3/1976 France ............................. 173/118

Primary Examiner—E. R. Kazenske
Assistant Examiner—Willmon Fridie, Jr.
Attorney, Agent, or Firm—Ronald B. Sherer; Edward D. Murphy; Harold Weinstein

[57] ABSTRACT

A hand-held power tool, for example a rotary percussive drill, includes a component for undergoing linear movement and a bearing support for the component. The bearing support comprises a cylinder formed from sheet metal strip with the longitudinal edges spaced to form a gap in the wall of the cylinder. By making the bearing support from a sheet metal strip and providing a gap in the cylinder wall considerable cost savings are achieved.

8 Claims, 12 Drawing Figures

HAND-HELD POWER TOOLS INCLUDING BEARING SUPPORTS FOR COMPONENTS UNDERGOING LINEAR MOVEMENT

FIELD OF THE INVENTION

This invention relates to a hand-held power tool including a bearing support for a component undergoing linear movement or motion approximating to linear movement and has particular reference to such bearing supports for use in a percussive drill.

BACKGROUND OF THE INVENTION

An example of a hand-held power tool having a component guided for linear movement is a rotary percussive drill in which hammer blows are imparted to a tool or a tool holder through the medium of a piston and ram combination movable relatively to a bearing support in the form of a guide tube cylinder in which the combination is located.

The guide cylinder is formed from a steel tube and has to be accurately sized. Additionally, holes have to be provided in the wall of the cylinder; these, of necessity, must be formed from outside the guide cylinder and this leaves burrs on the inside face of the cylinder wall. Such burrs are difficult to remove. The guide cylinder has also to be machined to accommodate a mechanism for reciprocating the piston combination relatively to the guide cylinder and this adds considerably to the production costs of the guide cylinder.

SUMMARY OF THE INVENTION

According to the present invention, a bearing support for a component undergoing linear movement comprises a cylinder formed from sheet metal strip, the longitudinal edges of the strip being spaced apart to form a gap in the wall of the cylinder.

By making the bearing support from a sheet metal strip and providing a gap in the wall of the cylinder considerable cost savings are achieved.

The gap may extend over the entire length of the cylinder or over a part only thereof. The gap may be parallel with the longitudinal axis of the cylinder, or it may be inclined thereto, or it may extend in helical manner round part at least of the circumference of the cylinder.

The cylinder may be of circular or non-circular cross section.

A portion of the bearing support may be cut away at one end to permit the connection of a drive to the component. Those parts of the cylinder defining the cut away portion may comprise guide surfaces for the drive or a part thereof.

The tool may be a rotary percussive hammer, a jig-saw, a sabre saw or a hedge trimmer or clipper.

According to another aspect of the invention there is provided a hand-held hammer drill including a percussive mechanism which includes a piston and ram combination and a bearing support for the piston and ram combination, characterised in that the bearing support comprises a cylinder formed from sheet metal strip and the longitudinal edges of the strip are spaced apart to form a gap in the wall of the cylinder.

Either the piston or the cylinder of the combination may be mounted in the bearing support.

One or more holes may be provided in the guide cylinder to allow the passage of air into and out of the piston and cylinder combination. Such holes can be made in the guide cylinder while it is in the form of a sheet metal strip.

BRIEF DESCRIPTION OF THE DRAWINGS

By way of example only, tools embodying the invention will now be described in greater detail with reference to the accompanying drawings of which.

DETAILED DESCRIPTION OF THE PREFERRED EMBODIMENTS

Figure 1:
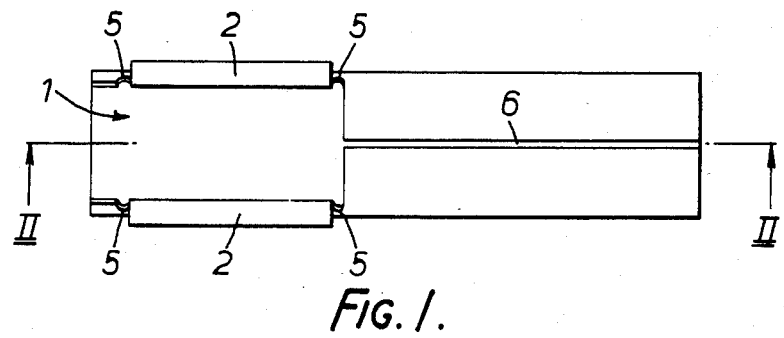
FIG. 1 is an underneath view of a guide cylinder.

The guide cylinder is formed from mild steel strip which is first cut to length. Then by a stamping or similar process, a portion 1 at one end of the strip is removed, the longitudinal edges of the strip bounding the portion being turned over to form guide surfaces 2. During this process, holes 3 are formed care being taken to ensure that the holes are formed in a outward direction with respect to the final tubular form of the guide. In the embodiment shown in the drawings, two further holes 4 are also formed at this stage. The function of these holes will be dealt with below. Formation of the guide surfaces 2 may be assisted by means of small recesses 5 that are formed during the initial stamping step; such recesses assist in the location of the forming tool that produces the guide surfaces.

The strip is then manipulated into a tubular form, the longitudinal edges of the strip being left closely adjacent but not in actual contact as indicated in the drawings by the gap 6.

The guide is now ready to be incorporated in a hammer drill as will be described shortly.

It will be appreciated that the method of construction just described removes the need for extreme accuracy as regards the diameter of the bore of the guide cylinder. The fact that the longitudinal edges of the strip are not secured together allows the guide cylinder to flex radially to accommodate the component that is to move linearly in the tube.

The presence of the gap 6 facilitates the introduction of lubricant into the bore and it will be appreciated that access to the component for such lubricant can be improved if the gap is helical or part helical. Gaps of such contours can be provided by forming the guide cylinder from strip, whose longitudinal edges or parts thereof are inclined with respect to the longitudinal axis of the strip.

If the internal surface of the guide tube is to be coated with an anti-friction material, this can be readily effected by coating the flat strip. Similarly, any other special surface treatment of the internal surface of the guide tube can be completed before the strip is formed into a tube.

Figure 2:
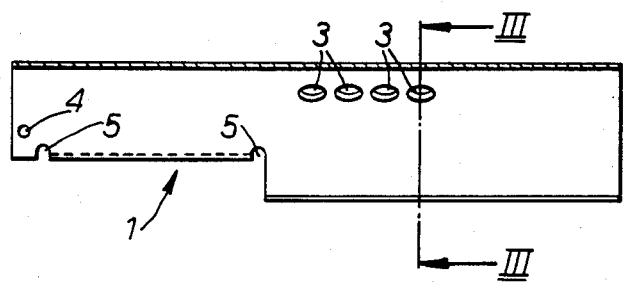
FIG. 2 is a section on the line II—II of FIG. 1.
Figure 3:
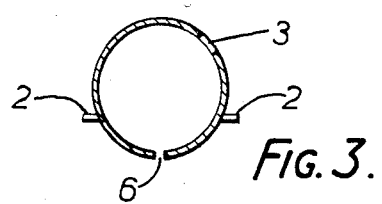
FIG. 3 is a section on the line III—III of FIG. 2.
Figure 4:
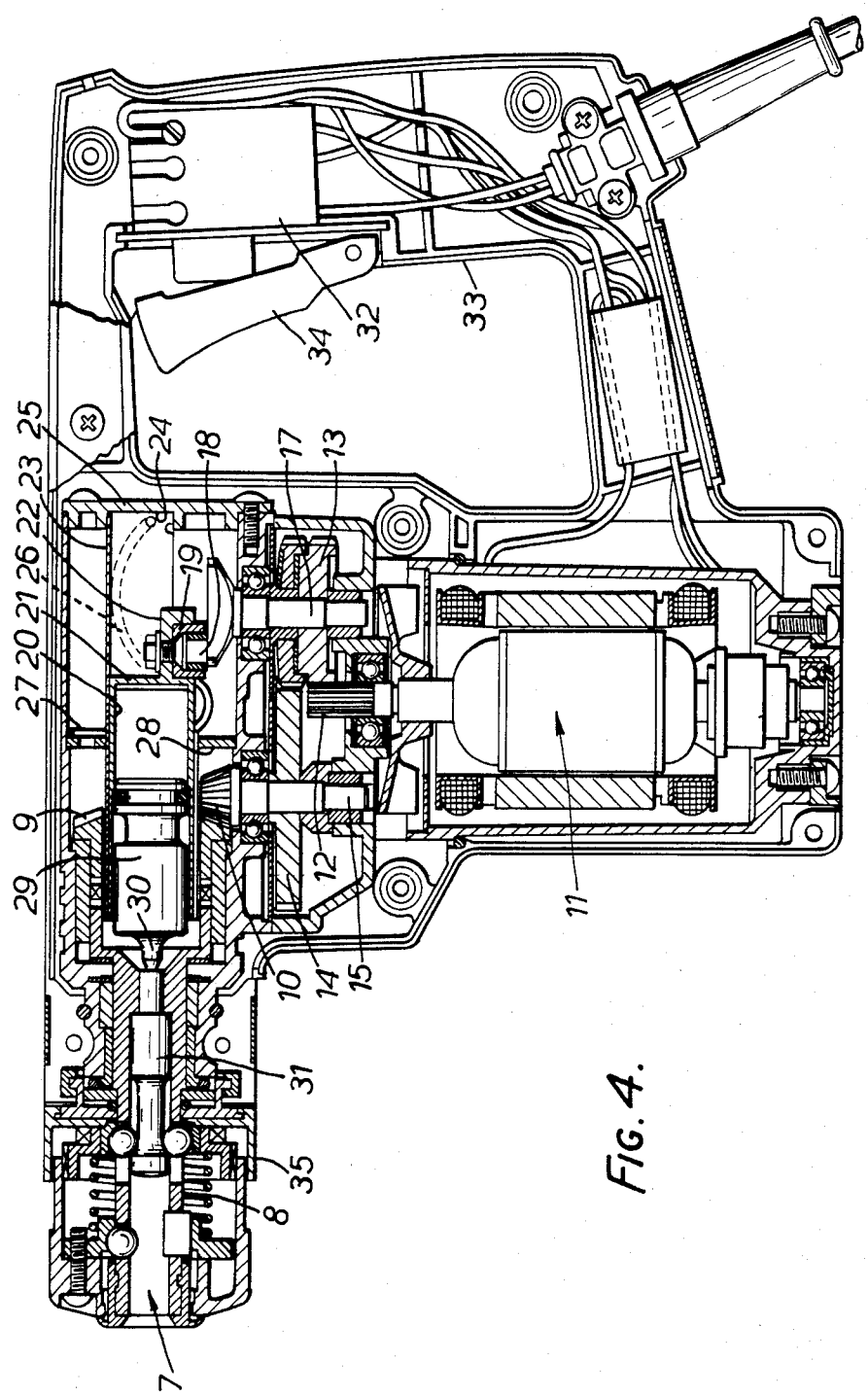
FIG. 4 is a section of a hammer drill incorporating the guide cylinder of FIGS. 1, 2 and 3.

FIG. 4 is a vertical section through a rotary percussive drill including a guide cylinder as shown in FIGS. 1–3.

The drill has a bit holder 7 including a tubular sleeve 8 engaging via teeth 9 with a bevel gear 10 through which rotation about its longitudinal axis is imparted to the sleeve 8. The bevel gear 10 is driven by an electric motor 11 via driving teeth 12 formed on the armature shaft of the motor, and pinions 13 and 14, the latter being secured on a shaft 15 to which the bevel gear 10 is fixed.

Pinion 13 is fixed to a shaft 17 to whose upper end (as seen in FIG. 4) is secured a crank drive including pin 18 which engages a guideway 19. The guideway 19 is mounted transversely of the longitudinal axis of a hollow piston 20 whose end wall 21 has an extension 22 in which the guideway 19 is mounted.

The hollow piston 20 is guided for linear movement in a guide cylinder 23 identical with the guide cylinder described above with reference to FIGS. 1–3.

The guide cylinder 23 is orientated with the cut away portion at the right-hand end (as seen in FIG. 4), this portion accommodating the transverse guideway 19 whose extremities move along guide surfaces corresponding with the guide surfaces 2 described above.

Figure 8:
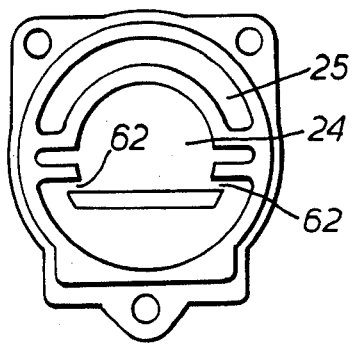
FIG. 8 is a view in the direction of the arrow A in FIG. 4 of the end wall for the housing of the hammer drill of FIG. 4.

That end of the guide cylinder 23 adjacent the cut away portion locates in a recess 24 in an end wall 25 of a housing enclosing the drive and other components as shown. The end of the guide cylinder 23 is resiliently held in the recess 24 by a spring whose end portions fit into the holes 4, referred to above, in the guide cylinder. The spring has two limbs 26 that extend one on each side of the guide cylinder and a base portion 27 that seats on an internal wall 28 positioned within the housing as shown. FIG. 8 shows the shape of the recess 24 in more detail: the recess is of part circular cross-section matching the exterior cross-section of the cylindrical part of the guide cylinder 23 and has gaps 62 in its periphery to accommodate the guide surfaces 2.

Housed within the hollow piston 20 for movement relative thereto is ram 29 formed with a nose 30 which, as will be described below imparts blows to a beat piece 31 which transfers the blows to a bit held in the bit holder 7 but not shown in the drawing.

In operation, energisation of the motor 11 by means of a control switch 32 located in the handle 33 of the drill and operated by a trigger 34 rotates the sleeve 8 and thus a bit in the bit holder 7. Additionally, the hollow piston 20 is reciprocated in the guide cylinder 23 by the crank drive. Such reciprocation results in reciprocation of the ram 29 within the hollow piston 20 and the imparting of a series of impacts to the bit via the beat piece 31.

The drill is also provided with a mechanism to allow it to be operated in a "drill only" mode, i.e. without the percussive action of the ram 29 and beat piece 31.

A mode change ring 35 when rotated to a "drill only" position holds the beat piece 31 at the left-hand limit (as seen in FIG. 4) of its movement, this being a position in which it cannot be struck by the ram during movement of the latter. When the beat piece is held in that position, the ram 29 is capable of slightly greater movement to the left (as seen in FIG. 4) and this allows the ram 29 to move into a position in which holes in the wall of the hollow piston are uncovered—such holes registering with the holes 3 referred to above. This allows air to leak into and out of that part of the hollow piston 20 between the end wall 21 and the ram 29 and thus minimises movement of the ram 29 in the hollow piston 20.

When the mode change ring 35 is returned to its "drill/hammer" position, the beat piece 31 is released and when the bit is next pressed against a work piece the beat piece moves to the right (as seen in FIG. 4) into a position in which it can be impacted by the ram 29. Movement to the left of the ram is thus restricted with the result that the leakage of air referred to above ceases.

Figure 9B:
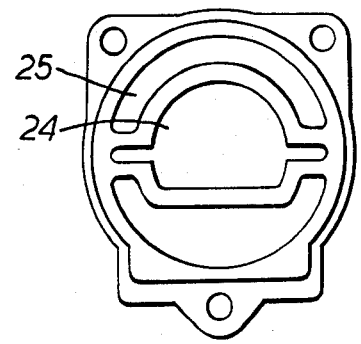
FIG. 9B is a view corresponding to FIG. 8 showing the end wall modified to receive the guide cylinder of FIG. 9A.
Figure 9A:
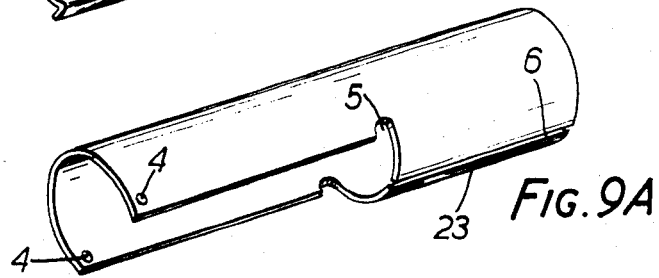
FIG. 9A is a perspective view of another modified form of the guide cylinder shown in FIGS. 1 to 3.

FIG. 9A shows a modification that may be made to the guide cylinder 23: in this case the longitudinal edges of the cut away portion are not turned over and the guide surfaces are formed merely by the edges of the strip; FIG. 9B illustrates how for this form of guide cylinder the gaps 62 may be omitted.

Figure 10B:
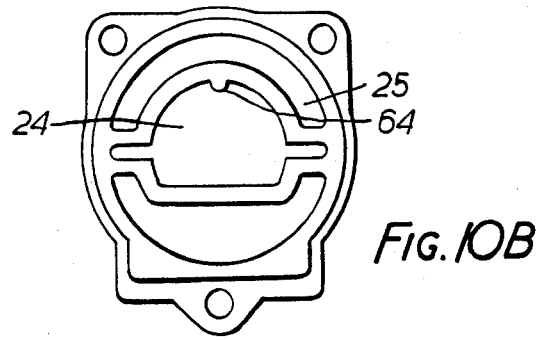
FIG. 10B is a view corresponding to FIG. 8 showing the end wall modified to receive the guide cylinder of FIG. 10A.
Figure 10A:
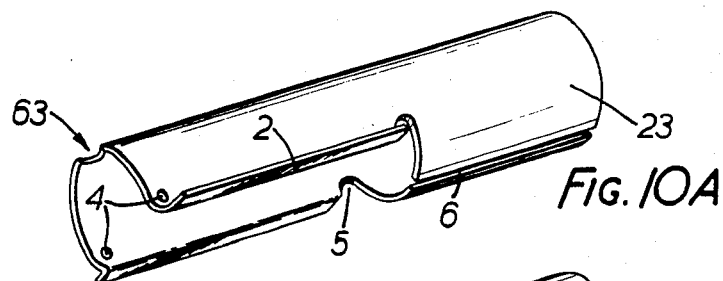
FIG. 10A is a perspective view of another modified form of the guide cylinder shown in FIGS. 1 to 3.

FIG. 10A shows another modification that may be made to the guide cylinder: in this case the end of the cut away portion has a central cut out 63 and the corners of the strip at this end are radiused; the end wall 25 shown in FIG. 10B has a raised pip 64 projecting into the recess 24 for engaging the cut out 63 on the guide cylinder; since the guide surfaces 2 terminate short of the end of the cylinder the gaps 62 of FIG. 8 may again be omitted.

It will be understood that in FIGS. 1 to 3,4, 9A, 9B, 10A and 10B the same reference numerals are used to designate corresponding parts.

Figure 5:
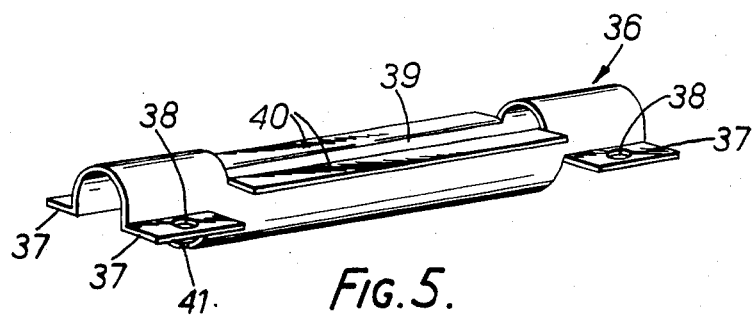
FIG. 5 is a perspective view of another form of guide cylinder.

FIG. 5 is a perspective view of another form of guide cylinder embodying the invention. The cylinder 36 is of sheet metal formed, when in strip form, to provide mounting ears 37 at each end of the strip, screw holes 38 in the ears 37, and a longitudinal slot 39 bounded by guide surfaces 40 that lie in a plane parallel to the longitudinal axis of the strip. After formation of the features just described, the strip is manipulated into a cylindrical form, the longitudinal edges of the strip being spaced to form a gap 41 lengthwise of the formed cylinder.

Figure 6:
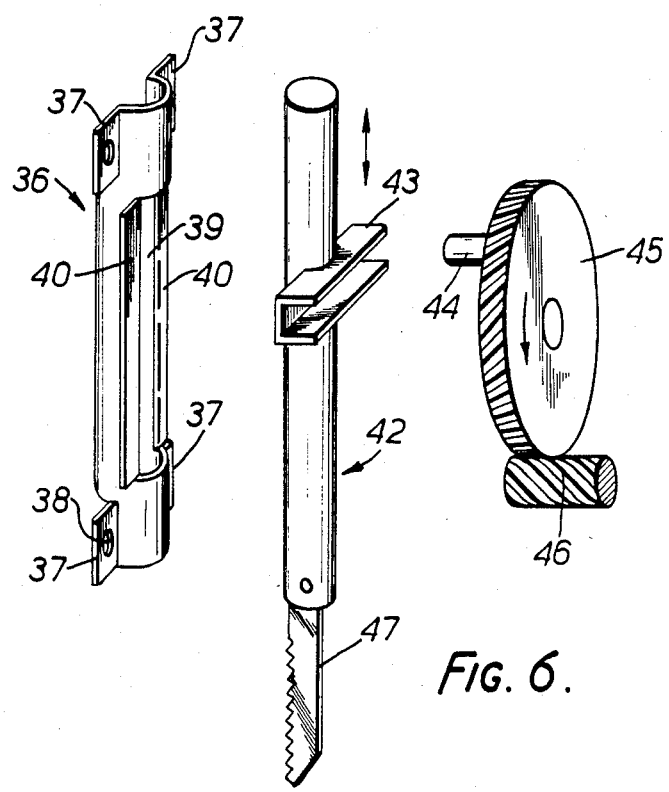
FIG. 6 shows in exploded perspective form, parts of a jig-saw, one of which parts is the guide cylinder shown in FIG. 5.

The guide cylinder 36 is intended to accommodate the plunger 42 of a jig-saw or sabre saw of which only certain components are shown in FIG. 6.

Mounted approximately midway of the length of the plunger 42 is a transverse channel-shaped yoke 43 which forms a guide path for a pin 44 mounted eccentrically on one face of a crank disc 45 shown as meshing with a pinion 46 formed at one end of an armature shaft.

Yoke 43, and pin 44 constitute the well-known "Scotch Yoke" drive, rotation of crank disc 45 by pin 44 reciprocating the plunger 42 longitudinally in the guide cylinder 36. In use, a saw blade 47 is secured to the lower end (as seen in FIG. 6) of the plunger 42.

As compared with the conventional ways of supporting the plunger, the use of a guide cylinder is more effective and cheaper.

Figure 7:
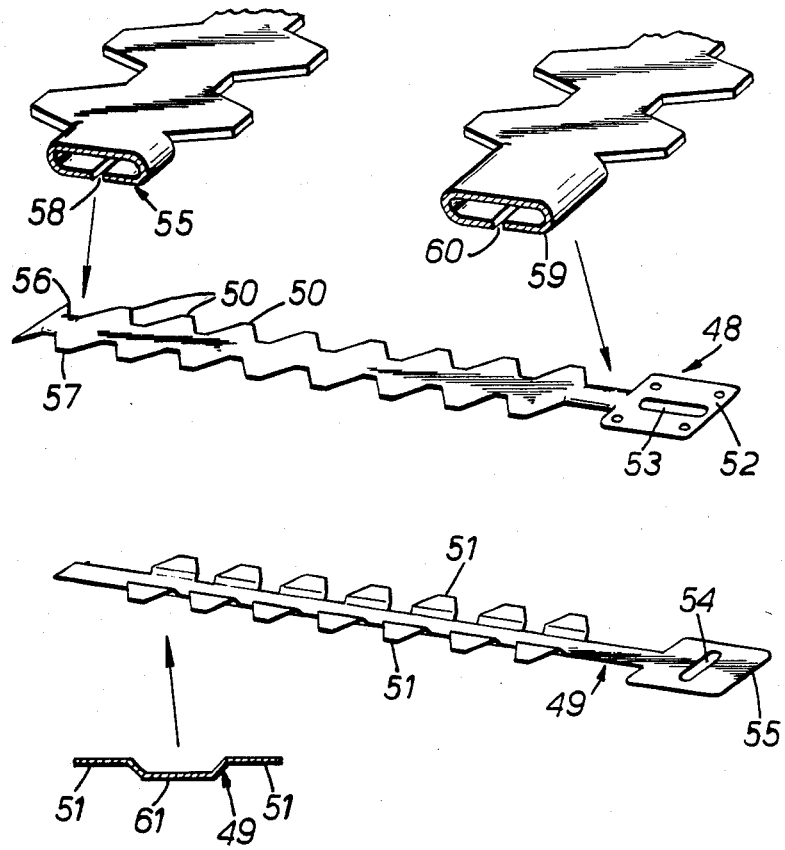
FIG. 7 shows in exploded perspective form components of a hedge trimmer and includes scrap views on a larger scale of parts of the components.

FIG. 7 shows in perspective, the blades of a hedge trimmer or garden clipper. Two such blades are shown, a stationary blade 48 and a moving blade 49. The blades 48, 49 are formed with transversely-extending spaced teeth 50, 51 respectively. At one end, blade 48 has a termination 52 by which the blade is mounted, cantilever fashion, in a housing containing a drive mechanism, the termination being apertured at 53 to accommodate a driving pin forming part of that mechanism and which coacts with a driving slot 54 formed in a termination 55 of blade 49 to reciprocate the latter blade relatively to blade 48.

Adjacent its other end, blade 48 is formed with an integral cylindrical guide portion 55 located between the end tooth 56 and the next adjacent tooth 57. The guide portion 55 has a gap 58.

A similar integral guide cylinder 59 is created at the one end of blade 48, the cylinder being "gapped" as at 60. Both cylinders 55 and 59 are shown, on an enlarged scale, as scrap views forming part of FIG. 7.

The guide cylinders 55 and 59 guide the moving blade 49 which is formed with a central longitudinal strip 61 that lies in a plane spaced from that containing the teeth 51. This strip 61 locates, at each end, in the guide cylinders 55 and 59, the contour of the blade 49 allowing the teeth 51 thereof to reciprocate in contact with the teeth 50 of blade 48 to effect the conventional shearing action of hedge trimmers.

Blades 48, 49 are made from sheet metal strip by a stamping or similar action, to form the teeth 50, 51, terminations 52, 55 and aperture 53 and slot 54, the guide cylinders 55 and 59 then being formed.

It will, of course, be appreciated that the guide cylinders may, alternatively, be formed in the moving blade, the stationary blade then being contoured accordingly.

The incorporation of the guide surfaces in one or other of the blades simplifies the support of the moving blade and is more economic than conventional ways of supporting the blade.

We claim:

1. A hand-held power tool, comprising:
   a housing;
   a motor mounted in said housing;
   a component for undergoing linear reciprocating movement for actuating a tool member when present;
   a bearing support mounted in said housing and within which said component is reciprocally driven by said motor;
   said bearing support comprising a guide cylinder of sheet metal, said guide cylinder having been formed from a strip of the sheet metal;
   said guide cylinder having a gap extending along the full length thereof and defined by two opposed edge portions of said sheet metal, at least part of the length of said gap being defined by closely adjacent edges of said sheet metal, said closely adjacent edges not being in actual contact;
   said guide cylinder being able to flex radially due to said gap and to being formed from sheet metal in order to accommodate said component therewithin;
   said guide cylinder having a cut away portion at one end to accommodate a reciprocating drive connection between said component and said motor, said cut away portion defining a substantially wider portion of said gap than said at least part defined by said closely adjacent edges; and
   said cut away portion having turned over longitudinal edges comprising guide surfaces for a part of said reciprocating drive connection.

2. The hand-held power tool of claim 1, wherein air leakage holes are formed in said guide cylinder, said holes being formed through the sheet metal in a direction from inside to outside said guide cylinder to avoid the occurrence of burrs inside said guide cylinder.

3. The hand-held power tool of claim 1, wherein recesses are formed in said sheet metal at the junction between said cut away portion and the remainder of said guide cylinder to assist in the formation of said guide surfaces.

4. The hand-held power tool of claim 1, wherein recesses are formed in said sheet metal adjacent each end of said guide surfaces.

5. The hand-held power tool of claim 1, wherein said gap is parallel with the longitudinal axis of said guide cylinder.

6. The hand-held power tool of claim 1, wherein said cut away portion is located in a recess in a wall of said housing.

7. The hand-held power tool of claim 6, wherein said cut away portion is resiliently held in said recess by a spring.

8. A hand-held power tool, comprising:
   a housing;
   a motor mounted in said housing;
   a component for undergoing linear reciprocating movement for actuating a tool member when present;
   a bearing support mounted in said housing and within which said component is reciprocally driven by said motor;
   said bearing support comprising a guide cylinder of sheet metal, said guide cylinder having been formed from a strip of the sheet metal;
   said guide cylinder having a gap extending along the full length thereof and defined by two opposed edge portions of said sheet metal, at least part of the length of said gap being defined by closely adjacent edges of said sheet metal, said closely adjacent edges not being in actual contact;
   said guide cylinder being able to flex radially due to said gap and to being formed from sheet metal in order to accommodate said component therewithin;
   said guide cylinder having a cut away portion at one end to accommodate a reciprocating drive connection between said component and said motor, said cut away portion defining a substantially wider portion of said gap than said at least part defined by said closely adjacent edges;
   said cut away portion being located in a recess in a wall of said housing; and
   said wall having a raised pip projecting into said recess, said pip engaging a cut out in said cut away portion.

* * * * *